United States Patent Office 3,814,684
Patented June 4, 1974

3,814,684
RESIDUE HYDRODESULFURIZATION PROCESS WITH CATALYSTS WHOSE PORES HAVE A SMALL ORIFICE SIZE
Robert D. Christman, Pittsburgh, Pa., George E. Elliott, Jr., Bay Village, Ohio, and Joel D. McKinney, Indiana, and Geoffrey R. Wilson, Pittsburgh, Pa., assignors to Gulf Research & Development Company, Pittsburgh, Pa.
Filed June 14, 1972, Ser. No. 262,844
Int. Cl. C10g 23/02
U.S. Cl. 208—216
8 Claims

ABSTRACT OF THE DISCLOSURE

A process for the hydrodesulfurization of a crude oil or a reduced crude oil containing the asphaltene fraction of the oil comprising passing the oil and hydrogen over a catalyst comprising supported Group VI and Group VIII metals for a total throughput of less than 34 barrels of oil per pound of catalyst. The pore radius of the catalyst at which one-half of the total pore volume is filled with liquid nitrogen in a liquid nitrogen desorption isotherm measurement is above 40 but less than 58 A. The pore radius at which one-half of the total pore volume is filled with liquid nitrogen in the preceding adsorption portion of the same isotherm measurement is between 15–30 A. higher than said desorption measurement.

Figure 1A:
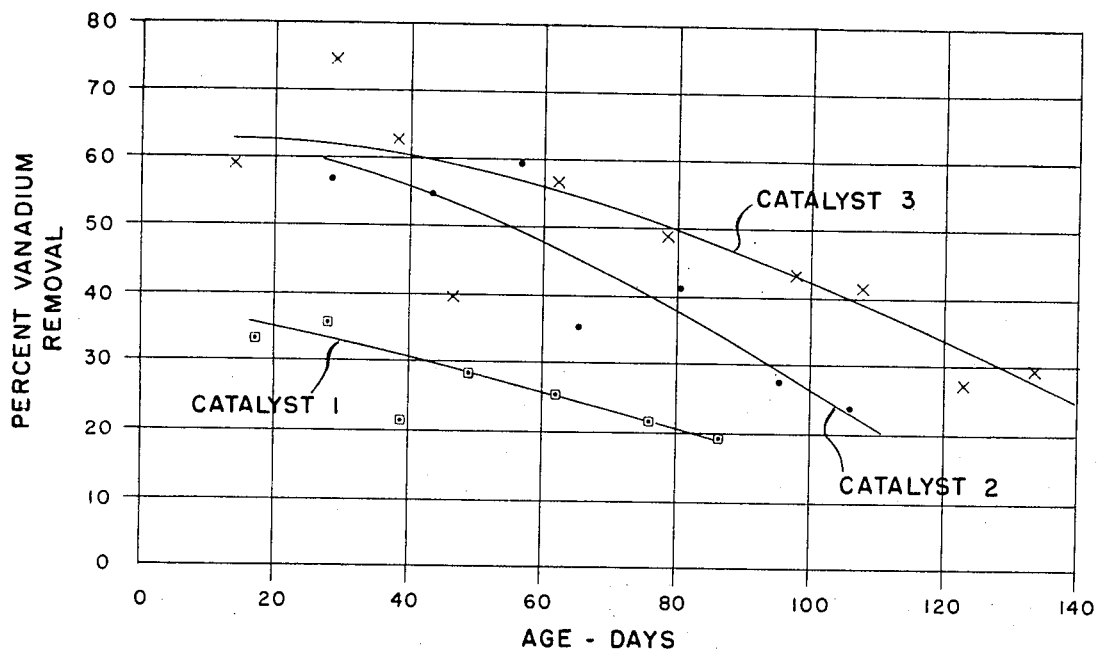

This invention relates to a process for hydrodesulfurization of metal-containing crude petroleum oil or residual oil employing catalysts whose pore structure possesses relative dimensions adapted to provide a predetermined balance between catalyst activity on the one hand and long catalyst life on the other hand.

A high proportion of the sulfur content of crude and residual petroleum oils is contained in the heavy fractions of the oil, such as the propane-insoluble asphaltene and resin fractions which contain substantially the entire metal content of the oil. The hydrodesulfurization process of the present invention is directed towards the removal of sulfur present in these oils in the presence of Group VI and Group VIII metal-containing catalysts supported on a suitable support, such as alumina which contains less than 5 percent silica, generally, and preferably less than one percent of silica. If desired, other porous oxides and/or mixed oxide supports can be used, such as alumina-magnesia, silica-magnesia, etc. Preferred catalysts are nickel-molybdenum, cobalt-molybdenum or nickel-cobalt-molybdenum on alumina. Tungsten can replace molybdenum in such combinations. The metal-impregnated supported catalysts have a high pore volume, i.e. a pore volume of at least about 0.4 or at least 0.45 or 0.5 cubic centimeter per gram. This pore volume is made up predominantly of relatively large pore sizes which are particularly adapted to admission of the relatively large size molecules in which the sulfur is concentrated. It is shown below that the pores are provided with inlet orifice restrictions which are sufficiently large to admit the sulfur-containing molecules but which are small enough to tend to reject the metal-containing molecules which are the largest molecules contained in the crude. The metal-containing molecules are larger than the molecules requiring desulfurization and tend to rapidly deactivate the catalyst by depositing metals in the pores.

A highly critical feature of the present invention is the method utilized to determine the size of catalyst pores. Catalyst pore size is a function in large part of the temperature, water content and other conditions of calcination used in preparing both the support and the catalyst. In determining catalyst pore size the method of isothermal nitrogen adsorption at liquid nitrogen temperatures is commonly employed. This method measures milliliters of nitrogen (at standard temperature and pressure) adsorbed per gram in terms of relative pressure $P/P_0 \cdot P$ is the pressure at which the gas is adsorbed and $P_0$ is the vapor pressure of the nitrogen at the adsorption temperature. However, it is an important feature of the present invention that the method of nitrogen adsorption to determine pore size distribution cannot be employed by itself, especially in catalysts whose pores have a pronounced orifice, as explained below. Many catalysts of the present invention yield widely dissimilar pore size distribution data when tested at liquid nitrogen temperatures by the method of nitrogen adsorption as compared to the method of nitrogen desorption. The nitrogen adsorption tests tend to indicate a relatively uniform distribution of pores over the entire range of pore sizes in the catalyst, with the most frequent pore size ranges appearing at deceptively high pore sizes. The nitrogen desorption tests indicate a much less uniform distribution of pore sizes and a relatively high concentration of the total pore volume in a relatively narrow range of relatively smaller pore sizes. This feature of nitrogen adsorption and desorption test measurements is shown more fully in a patent application filed on even date herewith entitled, "Hydrodesulfurization Process with Catalysts Whose Pore Sizes are Concentrated in a Narrow Range" in the names of R. D. Christman, J. D. McKinney and G. R. Wilson.

The reason for the disparate results when using the nitrogen adsorption method as compared to the nitrogen desorption method is evidently due to the configuration of the pores. When the pores tend to have a relatively uniform diameter throughout or are below 35 to 40 A. in radius, the nitrogen adsorption and desorption methods tend to produce equivalent or comparable results. However, when the pores are above 35 to 40 A. in radius and the shape of the pores deviate from a uniform, cylindrical configuration so that an ink bottle or balloon shape pore configuration becomes manifest with the opening or orifice of the pore at the surface of the catalyst having a relatively narrow neck and the main body of the pore being enlarged, the described discrepancy in apparent pore size distribution when employing the adsorption and desorption methods becomes apparent. The discrepancy in the apparent pore size distribution as determined by the adsorption and desorption methods becomes larger as the body of the pore becomes larger compared to the neck or orifice of the pore.

The differing results obtained between adsorption and desorption pore size methods are accounted for by the fact that during the adsorption portion of the test the nitrogen enters the pore relatively easily upon an increase in nitrogen pressure until pore saturation occurs. However, upon subsequently reducing nitrogen pressure at the same temperature in the desorption portion of the same test, the nitrogen does not always escape from the pores as easily as it entered so that the amount of nitrogen contained within the catalyst at a given relative pressure of nitrogen in the desorption isotherm portion of the test can be greater than the amount of nitrogen contained in the catalyst at the same nitrogen relative pressure in the preceding adsorption portion of the test. In fact, a residual amount of nitrogen can remain trapped within the catalyst pores even at the conclusion of the desorption portion of the test at zero relative nitrogen pressure at liquid nitrogen temperatures.

The narrower that the neck of the pore is relative to the body of the pore the more difficult it is for the nitrogen within a pore to escape during the desorption portion of the isotherm test. On the other hand if the pore opening were unobstructed by an orifice, the liquid nitrogen adsorbed would be able to escape from the pore with the same ease with which it entered the pore, in which case the adsorption and desorption portions of the isotherm test would tend to indicate the same pore size distribution.

Table I contains detailed physical characteristics data for five catalysts. The data in Table I represent the characteristics of finished catalysts each containing about the same quantity of nickel, cobalt and molybdenum impregnated on an alumina support containing less than one percent of silica. The metals can be impregnated on the support before or after forming the support with similar results. The adsorption-desorption data reported were obtained by the use of an Aminco Adsorptomat, Model No. 4–4680.

tivated. On the other hand, if the pore orifice is small it can serve as a membrane or a sieve, barring access of the very large metal-containing compounds to the interior of the pore of the catalyst, enabling the pore surfaces to retain high catalyst desulfurization activity for a prolonged throughput duration.

For this reason, a small pore orifice will tend to maintain high surface activity within the body of the pore by preventing access to the pores of the larger size metal-containing molecules. However, a correlative disadvantage in terms of decreased catalyst life occurs in the case of a catalyst whose pores have a small size orifice. This

TABLE I.—ADSORPTION-DESORPTION DATA FOR FRESH RESIDUE HDS FINISHED CATALYSTS

|  | Catalyst 1 | | Catalys 2 | | Catalyst 3 | | Catalyst 4 | | Catalyst 5 | |
|---|---|---|---|---|---|---|---|---|---|---|
| Compacted density, g./cc | 0.728 | | 0.736 | | 0.658 | | 0.792 | | 0.620 | |
|  | $N_2$ adsorption | $N_2$ desorption | $N_2$ adsorption | $N_2$ desorption | $N_2$ adsorption | $N_2$ desorption | $N_2$ adsorption | $N_2$ desorption | $N_2$ adsorption | $N_2$ desorption |
| Surface area, m²/g | 165.2 | 160.7 | 146.7 | 144.3 | 151.1 | 149.2 | 214.6 | 210.3 | 153.8 | 151.5 |
| Pore volume, cc./g | 0.54 | 0.56 | 0.51 | 0.52 | 0.65 | 0.66 | 0.48 | 0.5 | 0.591 | 0.588 |
| Pore radius, A., avg.: | | | | | | | | | | |
| Pore radius at which ½ total pore vol. is filled with liquid nitrogen | 76.8 | 56.4 | 96.0 | 64.7 | 114.6 | 80.3 | 65.9 | 53.7 | 101.1 | 77.3 |
| $2 \times 10^4 \times$ pore volume/surface area | 65.3 | 69.6 | 69.3 | 72.5 | 85.5 | 89.0 | 45.0 | 43.9 | 76.8 | 77.3 |
| Pore size dist., percent of pore volume: | | | | | | | | | | |
| 250–300 A.radius | 1.3 | 0.3 | 1.0 | 0.2 | 1.3 | 0.4 | 1.1 | 0.2 | 2.0 | 0.7 |
| 200–250 | 2.4 | 0.6 | 3.7 | 0.4 | 3.3 | 0.7 | 2.3 | 0.4 | 4.7 | 1.8 |
| 150–200 | 4.0 | 1.0 | 10.0 | 0.7 | 16.2 | 1.1 | 3.8 | 0.6 | 10.5 | 3.1 |
| 100–150 | 13.5 | 2.6 | 31.9 | 3.3 | 42.5 | 10.1 | 19.3 | 1.3 | 33.9 | 12.4 |
| 90–100 | 8.3 | 1.0 | 7.3 | 3.6 | 8.1 | 14.8 | 6.5 | 0.9 | 9.2 | 8.2 |
| 80–90 | 14.6 | 1.5 | 8.8 | 13.6 | 7.2 | 23.5 | 7.4 | 4.6 | 10.5 | 14.7 |
| 70–80 | 17.2 | 4.7 | 7.7 | 18.7 | 5.8 | 19.0 | 6.8 | 9.3 | 8.4 | 18.4 |
| 60–70 | 14.7 | 23.6 | 7.2 | 22.0 | 5.1 | 14.1 | 9.3 | 22.8 | 7.0 | 18.8 |
| 50–60 | 9.8 | 38.6 | 5.9 | 15.4 | 3.7 | 8.1 | 8.6 | 17.6 | 4.5 | 14.4 |
| 45–55 | 3.5 | 12.3 | 3.3 | 6.1 | 1.3 | 3.0 | 3.7 | 8.1 | 2.3 | 5.2 |
| 40–50 | 3.6 | 7.9 | 2.6 | 5.4 | 1.7 | 2.6 | 4.5 | 7.4 | 1.7 | 2.4 |
| 35–40 | 2.5 | 4.5 | 3.1 | 3.4 | 1.3 | 1.1 | 4.8 | 6.1 | 2.0 | 0.0 |
| 30–35 | 2.0 | 1.4 | 2.3 | 2.4 | 1.2 | 0.8 | 4.4 | 5.7 | 1.1 | 0.0 |
| 25–30 | 2.3 | 0.0 | 2.9 | 2.8 | 1.2 | 0.6 | 5.4 | 6.9 | 1.7 | 0.0 |
| 20–25 | 0.3 | 0.0 | 2.2 | 2.1 | 0.1 | 0.0 | 5.4 | 6.7 | 0.6 | 0.0 |
| 15–20 | 0.0 | 0.0 | 0.0 | 0.0 | 0.0 | 0.0 | 6.5 | 1.4 | 0.0 | 0.0 |
| 10–15 | 0.0 | 0.0 | 0.0 | 0.0 | 0.0 | 0.0 | 0.2 | 0.0 | 0.0 | 0.0 |
| 7–10 | 0.0 | 0.0 | 0.0 | 0.0 | 0.0 | 0.0 | 0.0 | 0.0 | 0.0 | 0.0 |

The data of Table I show for each of the catalysts measured a difference in average pore radius depending upon whether the measurement is made during the adsorption or desorption portion of the isotherm. Table I shows that the method used for measuring pore radius is critical since the described difference appears in determining average pore radius as that pore radius at which one-half of the total pore volume is filled with liquid nitrogen. No comparable difference appeared when employing the method of dividing 20,000 times the pore volume in cubic centimeters per gram by the surface area in square meters per gram because Table I shows that the pore volume and surface area values do not change significantly when measured by adsorption or desorption.

We have discovered in hydrodesulfurization tests employing hydrocarbon feed stocks including the metal-containing components of the feed, particularly vanadium- and nickel-containing molecules, that the relative size of the neck of the pore has a very great effect upon catalyst activity and aging characteristics when treating a residual oil comprising the metal-containing molecules, which are concentrated in the asphaltene and resin fractions of the crude and are the highest boiling materials in the crude oil. The average pore radius as obtained in desorption isotherm tests tends to be representative of the size of the neck or orifice of the pores while the average pore radius as determined by the adsorption isotherm tests tends to be representative of the size of the larger body of the pore. Since the metal-containing molecules tend to be the largest molecules in a petroleum oil, a relatively small pore orifice size tends to be a barrier or sieve preventing the admission of these large molecules to the interior of the catalyst pores. In the hydrodesulfurization reaction, most of the reaction occurs within the pores of the catalyst and if the metal-containing molecules are permitted easy access to the interior of the pores there is a high laydown of vandium and nickel contaminants upon the pore walls and the catalyst tends to become deactivated.

disadvantage arises when the metal-containing molecules which are barred from access to the body of the pore react sufficiently within the pore opening near the outer catalyst surface and deposit metals within the pore opening to abruptly substantially close-off the already restricted opening. When the pore orifice becomes blocked, the life of the catalyst is substantially terminated because the smaller sulfur-containing molecules are then prevented access to the body of the pore, even though the surface of the body of the pore is still highly active.

Table II shows that as a result of hydrodesulfurization of a reduced crude oil with catalysts 1, 2 and 3 of Table I, substantial amounts of metal, particularly vanadium, but also nickel, are deposited on the catalyst.

TABLE II.—FRESH AND SPENT MID-BED CATALYST METALS ANALYSIS

|  | Catalyst 1 | Catalyst 2 | Catalyst 3 |
|---|---|---|---|
| Fresh catalyst (weight percent): | | | |
| Nickel | 0.5 | 0.6 | 0.6 |
| Cobalt | 1.0 | 1.1 | 1.1 |
| Molybdenum | 8.0 | 9.9 | 7.5 |
| Silicon | | 0.13 | |
| Sulfur | | 0.67 | |
| Spent (EOR) mid-bed catalyst: | | | |
| Nickel | 3.0 | 3.8 | 4.1 |
| Cobalt | 0.58 | 0.47 | 0.35 |
| Molybdenum | 5.7 | 4.6 | 3.6 |
| Vanadium | 11.7 | 17.3 | 18.6 |
| Carbon | 3.74 | 5.78 | 5.16 |
| Sulfur | 17.3 | 20.9 | 23.0 |
| Weight of spent catalyst equivalent to 1 gram of fresh catalyst (gram) | 1.577 | 1.893 | 2.024 |

Table III shows the average pore radius and pore volume data for catalysts 1, 2 and 3 of Table II after they have become spent.

TABLE III.—RESIDUE HDS CATALYSTS

[Adsorption-desorption data for spent catalysts[a]]

|  | Catalyst 1 | | Catalyst 2 | | Catalyst 3 | |
| --- | --- | --- | --- | --- | --- | --- |
|  | $N_2$ adsorption | $N_2$ desorption | $N_2$ adsorption | $N_2$ desorption | $N_2$ adsorption | $N_2$ desorption |
| Surface area, m.²/g | 100.9 | 88.3 | 81.0 | 78.7 | 76.8 | 74.5 |
|  | [b](64.0) | [b](56.0) | [b](42.8) | [b](41.6) | [b](38.0) | [b](36.8) |
| Pore volume, cc./g | 0.27 | 0.29 | 0.20 | 0.19 | 0.22 | 0.22 |
|  | [b](0.17) | [b](0.19) | [b](0.11) | [b](0.10) | [b](0.11) | [b](0.11) |
| Pore radius, A., avg.: | | | | | | |
| Pore radius at which ½ total pore vol. is filled with liquid nitrogen | 64.7 | 43.5 | 66.3 | 49.1 | 72.0 | 52.0 |
| $2 \times 10^4 \times$ pore volume/surface area | 53.4 | 66.3 | 49.4 | 49.4 | 56.9 | 60.2 |
| Pore size dist., percent of pore volume: | | | | | | |
| 200–300 A. radius | 5.9 | 1.2 | 2.3 | 1.8 | 3.2 | 1.1 |
| 100–200 | 17.6 | 4.0 | 15.8 | 2.2 | 19.6 | 4.4 |
| 80–100 | 11.3 | 3.5 | 16.4 | 1.2 | 17.6 | 3.0 |
| 50–80 | 34.1 | 22.2 | 36.0 | 42.7 | 34.9 | 46.0 |
| Total: | | | | | | |
| 50–300 A. radius | 68.9 | 34.3 | 70.5 | 47.9 | 75.3 | 54.5 |
| 80–300 | 34.8 | 8.7 | 34.5 | 5.2 | 40.4 | 8.5 |

[a] Data corrected to a fresh catalyst weight basis.
[b] Data expressed per gram of spent catalyst.

Comparing the average pore radius and the pore volume of the spent catalysts from an HDS process as shown in Table III with the comparable fresh catalysts shown in Table I, it is seen that there is a considerable decrease in pore volume and average pore radius following hydrodesulfurization of residual petroleum oils, due to deposits of metals such as vanadium and nickel. Although Table II shows that other materials, such as carbon and sulfur, are deposited at the same time as vanadium and nickel, carbon and sulfur are materials that could be removed by regeneration while vanadium and nickel, being metals, cannot be removed by conventional regeneration so that once these metallic deposits become excessive the catalyst is permanently deactivated and must be discarded.

Figure 1B:
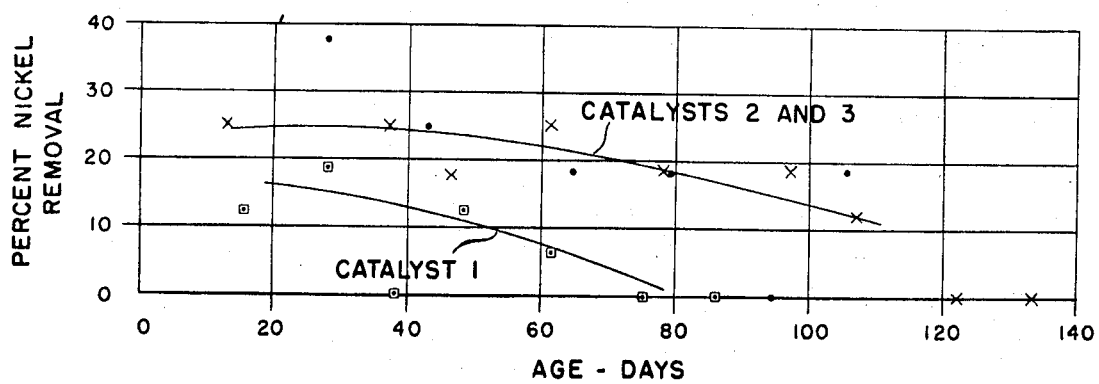
Figure 2:
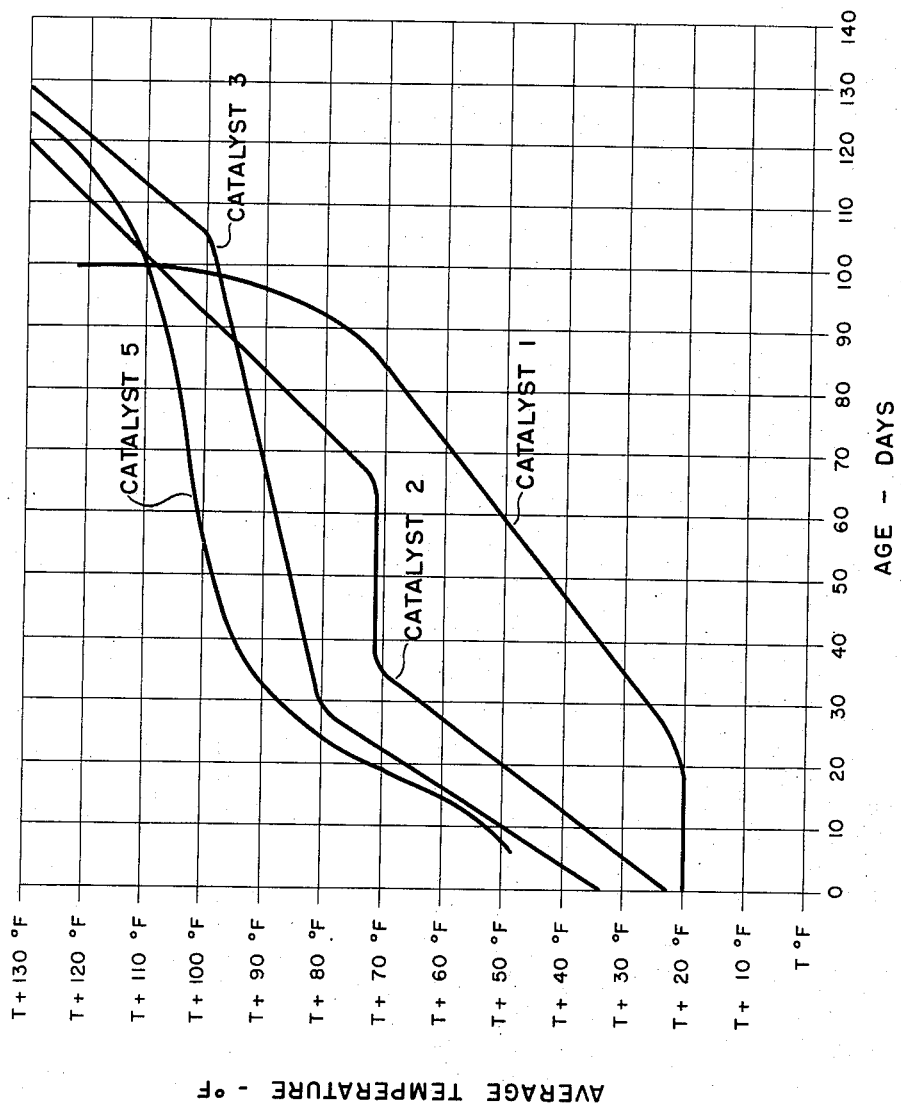

FIGS. 1A, 1B and 2 illustrate the importance of the pronounced ink bottle configuration of the catalysts 1, 2 and 3 in the treatment of crude and residual oil. The tests were made in a hydrodesulfurization process comprising passing a 650° F.+ residual oil charge downflow over a fixed bed of NiCoMo on alumina hydrodesulfurization catalyst at a 4.0 LHSV to reduce the sulfur content of the feed from about a 4 weight percent level to about a 2.4 weight percent level. The pressure was 2050 p.s.i.g. and the temperatures were whatever was required to produce a constant effluent sulfur level.

Evidence for the orifice size effect described above is illustrated graphically in FIGS. 1A, 1B and 2. FIG. 1A shows that catalyst 1, having the smallest average pore radius as determined in the desorption isotherm of catalysts 1, 2 and 3, removes the smallest amount of vanadium, while catalyst 2 which has an intermediate average pore radius as determined in the nitrogen desorption isotherm, removes an intermediate amount of vanadium and catalyst 3, which has the largest orifice as determined by the desorption isotherm, removes the greatest amount of vanadium from the feed, at all stages of catalyst aging. This indicates that the amount of large size metal-containing material admitted to the interior of the catalyst pores is directly proportional to the size of the catalyst orifice as determined by the nitrogen desorption isotherm data. FIG. 1B shows similar results in terms of nickel removal since FIG. 1B shows that catalyst 1, having the smallest pore orifice of catalysts 1, 2 and 3, removes a smaller amount of nickel at all stages of catalyst aging as compared to catalysts 2 and 3.

FIG. 2 represents the results in the same tests of the metal removing effect attributable to the size of the pore orifice restriction in terms of the sulfur-removal activity of the catalyst. Relative temperatures required to maintain a product having a constant level of sulfur were varied as indicated in FIG. 2, with higher temperatures generally required with increasing catalyst age.

FIG. 2 shows that catalyst 1, having the smallest orifice size of catalysts 1, 2 and 3 (the average pore radius which is the pore radius at which one-half of the total pore volume is filled with liquid nitrogen in the desorption isotherm is indicative of orifice size while the average pore radius which is the pore radius at which one-half of the total pore volume is filled with liquid nitrogen in the adsorption isotherm is indicative of the size of the body of the pore) was initially the most active of the three catalysts as evidenced by its ability to achieve a 2.4 weight percent sulfur production at a lower temperature than that required for the other catalysts. However, FIG. 2 shows that during aging of catalyst 1, because of its small orifice size, once the large metal-containing molecules which react on the surface of the catalyst begin to block the small orifice opening of the pores, deactivation occurs at a much more rapid rate than for the other catalysts shown in FIG. 2. FIG. 2, shows that catalyst 2, which exhibits an orifice opening of intermediate size between catalysts 1 and 3 as determined by nitrogen desorption data, showed an intermediate catalyst activity and an intermediate aging rate. On the other hand, catalyst 3, which possesses the largest pore orifice of catalysts 1, 2 and 3, as indicated by the desorption isotherm data of Table I, permitted the greatest amount of metal-containing molecules to enter within the body of the catalyst pores and thereby deactivate the pores. For this reason, catalyst 3 was initially the least active of catalysts 1, 2 and 3 and required the highest reaction temperatures to maintain a 2.4 weight percent level of sulfur in the effluent. However, catalyst 3, because of its large orifice opening, proved to be the most superior of catalysts 1, 2 and 3 in aging characteristics as evidenced by the longest catalyst life and the lowest aging rate at the end of the catalyst life. This superior aging activity occurred because the orifice was sufficiently large not to become abruptly plugged due to deposition of metals. Therefore, catalyst 3 was able to remain onstream for about eight days longer than catalyst 2 and for about twenty-eight days longer than catalyst 1 before reaching the terminal reaction temperature of the process.

As indicated above, the method used for determining pore radius and orifice size is a critical feature of this invention. In accordance with this invention, the size of the pore orifice is the pore radius at which one-half of the total pore volume is filled with liquid nitrogen in a desorption liquid nitrogen isotherm while the size of the pore body is indicated by the pore radius at which one-half of the total pore volume is filled with liquid nitrogen in the preceding adsorption portion of the same nitrogen isotherm. Table I shows that for catalysts 1, 2, 3 and 5 (it is explained below that catalyst 4 is not a useful catalyst for treating crude or residual oil), the pore orifice was from 20 to 34 A. smaller than the pore body when employing this method of measurement. Table I further shows that the average pore radius for catalysts 1, 2, 3 and 5 determined by another method, the value of 20,000 times the stated pore volume divided by the stated surface area, does not discern the existence of any orifice because the surface area and pore volume values for a catalyst are about the same no matter whether nitrogen adsorption or desorption is employed. In contrast, values of pore radius using the method of measurement of this invention are highly dependent upon whether adsorption or desorption is employed, especially in pores above 35 A. in radius. When the average pore radius is below 35 A., the pore radius values obtained will be about the same whether adsorption or desorption is employed even using the method of measurement of this invention.

FIG. 2 shows that catalyst 1 has such a small orifice radius (56.4 A.) that complete and abrupt catalyst deactivation following an initial high activity occurs at an early age due to orifice closure caused by metal deposition in the orifice. In fact, catalyst 1 deactivates at an infinite rate once serious deactivation begins. Catalyst 1 begins to deactivate rapidly at 85 days, corresponding to a throughput of 28.4 barrels of oil per pound of catalyst or 1293 barrels of oil per cubic foot of catalyst. Catalyst 1 reaches an infinite rate of deactviation at 100 days, corresponding to a throughput of about 34 barrels per pound or 1550 barrels per cubic foot. However, catalyst 2, with only a slightly lower orifice (64.7 A.) ages in a much more gradual manner. Catalyst 3 with a much larger orifice (80.3 A.) does not show greatly improved aging characteristics as compared to catalyst 2. Therefore, the 56.4 A. orifice radius of catalyst 1 represents a threshold orifice size when hydrodesulfurizing a crude or residual oil for extended aging periods, i.e. a total throughput above about 28 or preferably 34 barrels per pound of catalyst, and the catalyst can effectively surpass this critical threshold in throughput by a very slight increase in orifice size, i.e. to about 58 or 60 A. average orifice radius. This observation is underscored by the fact that the catalyst 4 having an orifice size of 53.7 A. is not even a useful hydrodesulfurization catalyst for metal-containing crude or residual oil at the test conditions used for the other catalysts and is only useful for treating substantially metal-free heavy gas oil and other distillates. Therefore, no aging curve for the catalyst of FIG. 4 is presented in Table 2. The aging characteristics are improved only slightly by increasing the orifice size to 75 or 80 A., and therefore the orifice size should not be increased beyond 75 to 80 A. because the small improvement in aging characteristics at these high orifice sizes are offset excessively by a loss in early catalyst activity. As shown by the data of Table I, whatever orifice size is employed, the radius of the pore body should be at least 15, 20 or 30 A. higher than the orifice radius in order to obtain the benefits of high catalyst activity realized by an ink bottle pore configuration.

If it is desired to employ a catalyst where high hydrodesulfurization activity is desired during a low total throughput wherein ultimate catalyst life is not an overriding problem, i.e. for throughput intervals of crude or residual oil feeds below 28 or 34 barrels per pound of catalyst, catalysts having an average pore orifice below 58 or 60 A. but abovve about 40 or 50 A., with an average body radius at least 15, 20 or 30 A. higher, can be employed. In this manner, the high activity of catalyst 1 can be realized, which would otherwise have to be foregone if an average orifice radius above 58 or 60 A. were employed, as in the case of the catalysts 2, 3 and 5.

Catalyst 5 shown in FIG. 2 illustrates the criticality of the difference in the average body size of the pores to average orifice size. The orifice size of catalyst 5 (77.3 A.) is about the same as the orifice size of the catalyst 3 (80.3 A.). However, the body size of catalyst 5 (101.1 A.) is appreciably smaller than the body size of catalyst 3 (114.6 A.) with the result that the catalyst 5 has a considerably lower activity, as shown in FIG. 2, than catalyst 3. Therefore, comparing the curves in FIG. 2 for catalyst 5 and catalyst 3, it is seen that it is far more preferable in terms of catalyst activity to have greater than a 30 A. difference between pore orifice size and pore body size, rather than about a 20 A. difference, at the given orifice size.

The crude oil or residue hydrodesulfurization process of this invention employs conventional reaction conditions such as, for example, a hydrogen partial pressure of 750 to 5000 pounds per square inch, generally, 1000 to 3000 pounds per square inch, preferably, and 1500 to 2500 pounds per square inch most preferably. The gas circulation rate can be between about 2000 and 20,000 standard cubic feet per barrel, generally, or preferably about 3000 to 10,000 standard cubic feet per barrel of gas preferably containing 85 percent or more of hydrogen. The mol ratio of hydrogen to oil can be between about 8:1 and 80:1. Reactor temperatures can range between about 650 and 900° F., generally, and between about 680 and 800° F., preferably. These temperatures are low enough so that not more than about 10, 15 or 20 percent of the charge is cracked to furnace oil or lighter. The liquid hourly space velocity can be between about 0.2 and 10, generally, between 0.2 and 1.25, preferably, or between about 0.4 and 1.0 most preferably.

The present invention is directed towards the hydrodesulfurization of a full crude or a residual oil containing substantially the entire asphaltene fraction of the crude from which it is derived and which therefore contains 95 to 99 weight percent or more of the nickel and vanadium content of the full crude. The nickel, vanadium and sulfur content of the liquid charge can vary over a wide range. For example, nickel and vanadium can comprise 15 to 1000, generally, or more commonly 20 to 300 parts per million or more of the charge oil while sulfur can comprise about 1 or 2 to 6 or 8 weight percent or more of the charge oil.

A catalyst having the physcial properties required for the process of this invention can be obtained from selected batches prepared by reacting ammonium alum crystals with strong aqua ammonia to convert them to alumina. The ammonium sulfate resulting from the reaction is removed by water washing and the alumina is recovered by filtration from the wash lquor. Aluminum hydroxide can also be precipitated from aqueous solutions of aluminum sulfate, aluminum chloride or aluminum nitrate by reaction with a suitable base. Aluminum hydroxide is also prepared by treating sodium aluminate with a mineral acid, such as sulfuric, hydrochloric or nitric acids. The wet alumina filter cake is either dried to the proper consistency or spray dried and reslurried in water to the required consistency and is then extuded into pellets. The alumina is crystalline and is principally boehmite with or without some bayerite. It can also contain some amorphous material. The pellets are dried at about 250° F. and heat treated at 700 to 1300 or 1500° F. for 1 to 24 hours to prepare them for impregnation. The higher the heat treatment temperature the shorter the required time for heat treatment. The calcined alumina will have the physical properties required for the catalyst of this invention and these properties will not be lost during impregnation of the Group VI and Group VIII metals.

Nickel, cobalt and molybdenum can be conveniently impregnated on the alumina in two steps as follows: (1) impregnation of the extruded alumina pellets with ammonium molybdate solution followed by oven drying, and (2) impregnation with a nickel nitrate-cobalt nitrate solution followed by oven drying and calcining.

The ammonium monomolybdate solution is prepared by dissolving ammonium paramolybdate $$[(NH_4)_6Mo_7O_{24} \cdot 4H_2O]$$

in distilled water, with addition of ammonia, and diluting with distilled water. In carrying out the first impregnation, the ammonium monomolybdate solution can be added with stirring to a vessel containing extruded alumina pellets previously dried to 1000° F. in 6 hours and holding at this temperature for 10 hours. The wet material is dried with stirring, at about 250° F. for 24 hours. The composition of the material after the first impregnation is approximately 8.2% molybdenum.

The nickel nitrate-cobalt nitrate solution is prepared by dissolving nickel nitrate [Ni(NO$_3$)$_2$·6H$_2$O] and cobalt nitrate [Co(NO$_3$)$_2$·6H$_2$O] in distilled water. The second impregnation is carried out in a manner similar to the first impregnation. The wet material is dried at about 250° F., for 24 hours and calcined by heating in air in an electric muffle furnace to 1000° F. in 6 hours and holding at this temperature for about 10 hours. The final composition is approximately 8 percent molybdenum, 1 percent cobalt and 0.5 percent nickel. The catalyst can be presulfided or is sulfided during the hydrodesulfurization process. Impregnation with a single solution of nickel, cobalt and mollbdenum salts can also be used.

Although the hydrogenating components indicated above can be employed in any proportions with respect to each other, especially effective catalysts for the purposes of this invention are those in which the hydrogenating component is selected from the group consisting of sulfides and oxides of (a) a combination of about 20 to 40 weight percent, preferably 4 to 16 percent, by weight molybdenum and one or two iron group metals where the iron group metals are present to the extent of 0.2 to 10 weight percent, and (b) a combination of about 5 to 40 percent, preferably 10 to 25 percent, by weight of nickel and tungsten.

We claim:

1. A process for the hydrodesulfurization of a metal-containing crude oil or metal-containing reduced crude oil comprising passing said oil and hydrogen over a catalyst comprising at least one Group VI metal and at least one Group VIII metal on alumina to reduce the sulfur content of said oil, said catalyst having a pore volume of at least 0.40 cc./gram, said catalyst having a pore body configuration as determined by nitrogen adsorption and nitrogen desorption measuring tests, each of said measuring tests indicating a different pore radius for said configuration, one of said measuring tests determining a catalyst pore radius under isothermal liquid nitrogen adsorption conditions and the other of said pore measuring tests determining a pore radius under isothermal liquid nitrogen desorption conditions, said measuring tests determining the average pore radiums of said catalyst by liquid nitrogen adsorption at which half the pore volume is filled with liquid nitrogen and determining the average pore radius of said catalyst by liquid nitrogen desorption at which half the pore volume is filled with liquid nitrogen, said desorption test pore radius being above 40 A. but less than 58 A. and the adsorption test radius being between 15–30 A. higher than said desorption pore radius, and passing a total throughput of said oil over said catalyst which is no greater than 34 barrels of oil per pound of said catalyst.

2. The process of claim 1 wherein said adsorption pore radius is at least 20 A. higher than said desorption pore radius.

3. The process of claim 1 wherein said adsorption pore radius is 30 A. higher than said desorption pore radius.

4. In the process of claim 1, passing a total throughput of said oil over said catalyst which is no greater than 28.4 barrels of oil per pound of catalyst.

5. The process of claim 1 wherein the catalyst pore volume is at least 0.5 cc./gram.

6. The process of claim 1 wherein the catalyst comprises cobalt and molybdenum.

7. The process of claim 1 wherein the catalyst comprises nickel and molybdenum.

8. The process of claim 1 wherein the catalyst comprises nickel, cobalt and molybdenum on alumina.

References Cited

UNITED STATES PATENTS

| | | | |
|---|---|---|---|
| 3,594,312 | 7/1971 | Christman et al. | 208—216 |
| 3,340,180 | 9/1967 | Beuther et al. | 208—216 |
| 3,322,666 | 5/1967 | Beuther et al. | 208—216 |

DELBERT E. GANTZ, Primary Examiner

G. J. CRASANAKIS, Assistant Examiner

UNITED STATES PATENT OFFICE
CERTIFICATE OF CORRECTION

Patent No. 3,814,684          Dated June 4, 1974

Inventor(s) R. D. Christman, G. E. Elliott, J. D. McKinney, G. R. Wilson

It is certified that error appears in the above-identified patent and that said Letters Patent are hereby corrected as shown below:

Table I, 1st entry in last column, "151.5" should be --151.3--.

Table I, 2nd entry in last column, "0.58ε" should be --0.585--.

Table I, Column 1, 8th line from bottom of table, "40-50" should be --40-45--.

Table I, Column 1, 9th line from bottom of table, "45-55" should be --45-45--.

Column 7, line 60, "abovve" should be --above--.

Column 8, line 42, "lquor" should be --liquor--.

Column 9, line 18, "mollbdenum" should be --molybdenum--.

Column 9, in Claim 1, line 42, delete the word "pore".

Column 10, in Claim 1, line 5, "radiums" should be --radius--.

Signed and sealed this 18th day of February 1975.

(SEAL)
Attest:

RUTH C. MASON
Attesting Officer

C. MARSHALL DANN
Commissioner of Patents
and Trademarks